United States Patent
Nechvatal et al.

[11] Patent Number: 5,549,059
[45] Date of Patent: Aug. 27, 1996

[54] CONVERTING PAPER MILL SLUDGE OR THE LIKE

[75] Inventors: Timothy M. Nechvatal, Brookfield; Thomas J. Jansen, Mequon, both of Wis.

[73] Assignee: Minergy Corp., Milwaukee, Wis.

[21] Appl. No.: 296,557

[22] Filed: Aug. 26, 1994

[51] Int. Cl.⁶ ..................................................... F23G 7/02
[52] U.S. Cl. .......................... 110/346; 110/238; 110/244; 110/259; 110/266
[58] Field of Search ..................................... 110/236, 238, 110/244, 346, 264, 266, 259

[56] References Cited

U.S. PATENT DOCUMENTS

| | | | |
|---|---|---|---|
| 4,932,336 | 6/1990 | Srowig et al. | 110/346 |
| 5,018,459 | 5/1991 | Judd | 110/346 |
| 5,052,312 | 10/1991 | Rackley et al. | 110/346 |
| 5,057,009 | 10/1991 | Nechvatal et al. | 432/14 |
| 5,346,549 | 9/1994 | Johnson | 106/708 |
| 5,370,065 | 12/1994 | Christensen | 110/346 |

OTHER PUBLICATIONS

Czuczwa, Warchol, Musiol, *Development Status of the Babcock and Wilcox Cyclone Vitrification Technology for Containated Soil*. Jun. 21, 1992.
Steam Its Generation and Use, Babcock & Wilcox pp. 14–1 to 14–11, 1992.

*Primary Examiner*—Henry A. Bennett
*Assistant Examiner*—Susanne C. Tinker
*Attorney, Agent, or Firm*—Quarles & Brady

[57] ABSTRACT

Paper mill sludge or similar organic sludges with a high ash content are converted by burning the sludge in a cyclone furnace along with another source of fuel. The heat content of the sludge is recovered and the ash content of the sludge is converted to a glassy slag. A flux, such as limestone, may be added to the sludge before introduction into the cyclone furnace. The slag is useful as a construction material, an abrasive, for roofing products, or for other purposes.

13 Claims, 1 Drawing Sheet

CONVERTING PAPER MILL SLUDGE OR THE LIKE

BACKGROUND OF THE INVENTION

This invention relates to the conversion of wastes, and more particularly to the conversion of sludges having a high organic content and a significant proportion of ash, such as paper mill sludge.

Pulp and paper companies produce large quantities of processed waste known as sludges. Typically, these sludges have been disposed of by landfilling. Growing shortage of landfill space and more restrictive environmental regulations have made that method of disposal more costly and less desirable.

The sludge from a recycled paper process provides a greater problem of disposal than does the sludge from standard paper processes. Sludge from the recycling process contains a significant amount of fiber and paper coatings. The amount of sludge generated from the paper recycling process is more than the amount of sludge generated from virgin pulp. The advent of widespread paper recycling has resulted in an increase in the total quantity of sludge.

As an alternative to landfilling, paper mill sludge has been burned using fluidized bed boiler technology. Burning the sludge recovers its heat content, vaporizes the moisture content, and reduces the waste volume. However, because of the large ash content in paper mill sludge, there still remains a considerable waste product that requires disposal such as by landfilling.

Cyclone furnaces have been used for many years for burning coal to power boilers. A characteristic of cyclone furnaces is that they generate a slag which has a glassy consistency. The slag from coal-fired cyclone boilers is used as a construction material in roads, as an abrasive or grit, and in roofing products.

Although cyclone furnaces were developed to burn coal grades that were not well-suited for pulverized coal combustion, they have also been used to burn solid waste fuels as a supplemental fuel, or to burn fuel oils or gases as the primary, contingency, or start-up fuel. When waste fuels are used with coal, such supplemental fuel typically has a relatively low ash content and provides less than 20 percent of the heat input and a smaller percentage of the pounds per hour of fuel fed to the cyclone furnace.

SUMMARY OF THE INVENTION

In accordance with the invention, paper mill sludge or other similar organic sludges with a high ash content is converted by burning the sludge in a cyclone furnace along with another source of fuel to recover the heat content of the sludge and to convert the ash content of the sludge to a desirable slag product. Preferably, the second source of fuel is natural gas and the sludge contributes up to 40 percent or more of the heat input to the cyclone furnace and may contribute the majority of pounds of fuel per hour. Drying of the sludge before burning may be necessary for handling. Drying to a moisture content of 20% or less has proven to be acceptable for introduction into a cyclone furnace. A flux, such as limestone, may be added to the sludge to ensure the development of a desirable glassy slag at the operating temperatures.

Paper mill sludge typically has a high ash content of between 20 and 50 percent on a dry basis. The sludge also has a significant organic composition such that the heating values of the sludge are typically between 4,000 btu/lb. and 7,500 btu/lb. on a dry basis. Although paper mill sludges are a preferred source for the fuel, other sludges having similar ash and heat value contents would be usable, such as sewage sludge or other industrial waste water sludges.

The heat value of the sludge is recovered by a boiler or other heat exchanger connected to the furnace. The high ash content of the sludge will be entrapped in the slag which, when cooled, will have a strong, hard, durable glassy consistency making it easily handled for use as a construction material, an abrasive, for roofing products, or for other useful purposes. Any heavy metals or other hazardous or undesirable components of the ash will be entrained within the glassy slag.

It is a principal object of the invention to provide a method of converting paper mill sludge and the like in an economical and environmentally safe manner.

It is another object of the invention to provide a method of recovering the heat value of paper mill sludge and the like while generating a usable product from the ash content of the sludge.

The foregoing and other objects and advantages of the invention will appear in the following detailed description. In the description, reference is made to the accompanying drawing which illustrates a preferred embodiment of the invention.

DETAILED DESCRIPTION OF THE PREFERRED EMBODIMENTS

Figure 1:
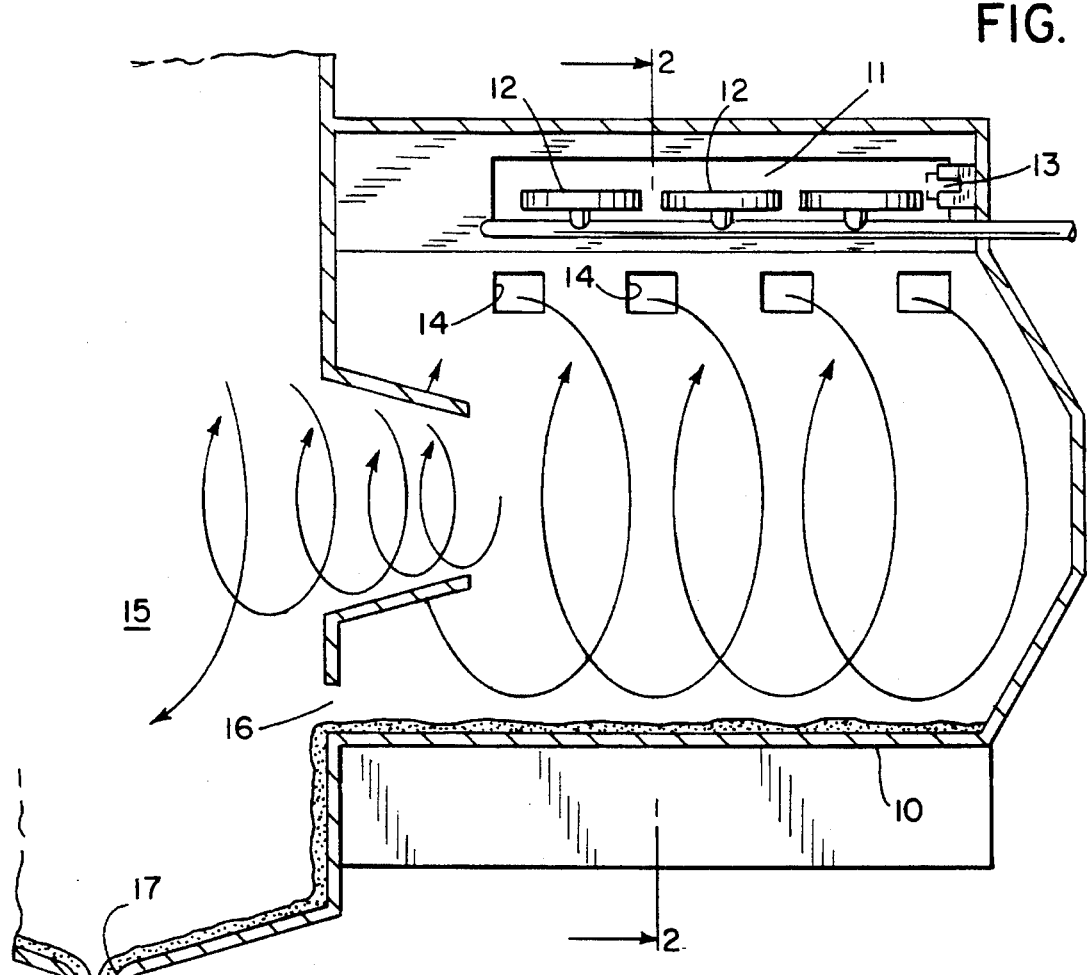
FIG. 1 is a longitudinal cross-section schematic drawing of a cyclone furnace for use in the method of the present invention.

Paper mill sludge can vary widely in its makeup. However, it generally has the characteristics of a high volatile component, including a significant percentage of carbon, and a high ash content. It also has a relatively high heating value. The proximate, ultimate, and mineral analyses for three typical paper mill sludges from paper recycling processes are shown in the following tables:

| | PAPER MILL SLUDGE "R" | | |
|---|---|---|---|
| Proximate Analysis, % | Dry Basis | Ultimate Analysis, % | Dry Basis |
| Ash | 48.64 | Carbon | 24.68 |
| Volatile | 50.26 | Hydrogen | 3.76 |
| Fixed Carbon | 1.10 | Nitrogen | 0.63 |
| | 100.00 | Sulfur | 0.06 |
| Btu/lb. | 4123 | Ash | 48.64 |
| Sulfur | 0.06 | Oxygen (diff) | 22.23 |
| MAF Btu | 8028 | | 100.00 |
| Mineral Analysis | | Ignited Basis, % Weight | |
| Silica, $SiO_2$ | | 39.86 | |
| Alumina, $Al_2O_3$ | | 34.21 | |
| Titania, $TiO_2$ | | 7.20 | |
| Iron oxide, $Fe_2O_3$ | | 0.85 | |
| Calcium oxide, CaO | | 13.30 | |
| Magnesium oxide, MgO | | 1.20 | |
| Potassium oxide, $K_2O$ | | 0.23 | |

-continued

| | |
|---|---|
| Sodium oxide, $Na_2O$ | 0.12 |
| Sulfur trioxide, $SO_3$ | 0.69 |
| Phosphorus pentoxide, $P_2O_5$ | 0.49 |
| Strontium oxide, SrO | 0.02 |
| Barium oxide, BaO | 0.05 |
| Manganese oxide, $Mn_3O_4$ | 0.07 |
| Undetermined | 1.71 |
| | 100.00 |

Method: ASTM Designation D 3682-87

PAPER MILL SLUDGE "IP"

| Proximate Analysis, % | Dry Basis | Ultimate Analysis, % | Dry Basis |
|---|---|---|---|
| Ash | 20.21 | Carbon | 47.27 |
| Volatile | 56.74 | Hydrogen | 4.40 |
| Fixed Carbon | 25.05 | Nitrogen | 1.33 |
| | 100.00 | Sulfur | 1.00 |
| Btu/lb. | 7734 | Ash | 20.21 |
| Sulfur | 1.00 | Oxygen (diff) | 25.79 |
| MAF Btu | 9693 | | 100.00 |

| Mineral Analysis | Ignited Basis, % Weight |
|---|---|
| Silica, $SiO_2$ | 38.85 |
| Alumina, $Al_2O_3$ | 16.92 |
| Titania, $TiO_2$ | 1.40 |
| Iron oxide, $Fe_2O_3$ | 5.07 |
| Calcium oxide, CaO | 14.94 |
| Magnesium oxide, MgO | 4.88 |
| Potassium oxide, $K_2O$ | 2.01 |
| Sodium oxide, $Na_2O$ | 1.27 |
| Sulfur trioxide, $SO_3$ | 8.23 |
| Phosphorus pentoxide, $P_2O_5$ | 3.24 |
| Strontium oxide, SrO | 0.04 |
| Barium oxide, BaO | 0.33 |
| Manganese oxide, $Mn_3O_4$ | 0.39 |
| Undetermined | 2.43 |
| | 100.00 |

Method: ASTM Designation D 3682-87

PAPER MILL SLUDGE "JR"

| Proximate Analysis, % | Dry Basis | Ultimate Analysis, % | Dry Basis |
|---|---|---|---|
| Ash | 45.98 | Carbon | 25.24 |
| Volatile | 52.46 | Hydrogen | 3.84 |
| Fixed Carbon | 1.49 | Nitrogen | 0.37 |
| | 100.00 | Sulfur | 0.02 |
| Btu/lb. | 4031 | Ash | 45.98 |
| Sulfur | 0.02 | Oxygen (diff) | 24.55 |
| MAF Btu | 7462 | | 100.00 |

| Mineral Analysis | Ignited Basis, % Weight |
|---|---|
| Silica, $SiO_2$ | 40.29 |
| Alumina, $Al_2O_3$ | 31.96 |
| Titania, $TiO_2$ | 11.60 |
| Iron oxide, $Fe_2O_3$ | 0.87 |
| Calcium oxide, CaO | 12.64 |
| Magnesium oxide, MgO | 0.70 |
| Potassium oxide, $K_2O$ | 0.11 |
| Sodium oxide, $Na_2O$ | 0.15 |
| Sulfur trioxide, $SO_3$ | 0.36 |
| Phosphorus pentoxide, $P_2O_5$ | 0.20 |
| Strontium oxide, SrO | 0.05 |
| Barium oxide, BaO | 0.05 |
| Manganese oxide, $Mn_3O_4$ | 0.06 |
| Undetermined | 0.96 |
| | 100.00 |

Method: ASTM Designation D 3682-87

The foregoing analyses show ash levels from 18 to 43% and volatile matter from 44 to 50%. The heating values ranged from 4,031 to 7,734 Btus per pound on a dry weight basis. These paper mill sludges also exhibit burning profiles indicating good ignition characteristics in the dried samples. The ignition points compared favorably with coal of various types. Other paper mill sludges that are very high in fiber can have as little as 10% ash content.

Pilot study tests of the burning of paper mill sludge in a cyclone furnace were carried out in a small boiler simulator of Babcock & Wilcox which was fired by a single, scaled-down version of Babcock & Wilcox's cyclone furnace. A typical cyclone furnace is shown in FIG. 1 of U.S. Pat. No. 5,022,329, issued Jun. 11, 1991 to Rackley, et al. and assigned to the Babcock & Wilcox Company. The pilot study tests were conducted on a blend of paper mill sludges, with limestone added as a fluxing agent, and on sludge from a single source without a flux. Following is a listing of the proximate and ultimate analyses of the sludge blend, with limestone, in an as received, as fired, and dry basis.

COMPOSITE PAPER MILL SLUDGE WITH LIMESTONE

| Basis | As Rec'd | As Fired | Dry |
|---|---|---|---|
| Proximate Analysis, % | | | |
| Moisture | 50.79 | 18.34 | — |
| Volatile Matter | 24.61 | 40.84 | 50.01 |
| Fixed Carbon | 1.40 | 2.33 | 2.85 |
| Ash | 23.20 | 38.49 | 47.14 |
| Gross Heating Value Btu per Lb. | 1586 | 2631 | 3222 |
| Btu per Lb. (M&A Free) | — | — | 6095 |
| Ultimate Analysis, % | | | |
| Moisture | 50.79 | 18.34 | — |
| Carbon | 11.06 | 18.36 | 22.48 |
| Hydrogen | 1.36 | 2.26 | 2.77 |
| Nitrogen | 0.28 | 0.47 | 0.57 |
| Sulfur | 0.08 | 0.14 | 0.17 |
| Chlorine | 0.03 | 0.05 | 0.06 |
| Ash | 23.20 | 38.49 | 47.17 |
| Oxygen (Difference) | 13.20 | 21.89 | 26.81 |
| Total | 100.00 | 100.00 | 100.00 |
| Total Carbonate, % $CO_2$ | 5.94 | 9.86 | 12.08 |
| Calcium Carbonate, % $CaCO_3$ (Calc.) | 13.91 | 22.42 | 27.47 |

| Ash Analysis, % | |
|---|---|
| Silicon as $SiO_2$ | 31.93 |
| Aluminum as $Al_2O_3$ | 23.32 |
| Iron as $Fe_2O_3$ | 1.25 |
| Titanium as $TiO_2$ | 5.63 |
| Calcium as CaO | 28.23 |
| Magnesium as MgO | 5.53 |
| Sodium as $Na_2O$* | 0.32 |
| Potassium as $K_2O$* | 0.45 |
| Sulfur as $SO_3$ | 1.84 |
| Phosphorus as $P_2O_5$ | <0.10 |
| Total Carbonate as % $CO_2$ | 1.34 |
| Zinc as ZnO | 0.08 |

*By Flame Photometer.

Wet sludge produces handling problems. Sludge should preferably be dried to 20% or less moisture content prior to introducing it into the cyclone furnace. The dried sludge with limestone was passed through a ⅜" screen prior to being loaded into a feeder leading to the cyclone furnace.

Tests were run using a sludge heat input from about 10% up to about 40% of the total heat input to the furnace. In the first tests, natural gas was the other source of fuel. The cyclone furnace was hot and slag flowed out of the slag tap. The slag from the sludge co-firing was solid, hard, strong, and durable and similar to slag from coal combustion in a cyclone furnace.

After successfully demonstrating the co-firing of sludge and natural gas in the small boiler simulator, tests were performed in which shredded tires were added to reduce the natural gas input. The shredded tire fuel was passed through a ½" screen and mixed with the sludge. Tests were performed with about 10% and about 20% heat input from tires, 40% from sludge, and the remainder from natural gas. Both test runs were satisfactory.

Even though the pilot study tests used sludge that contributed less than the majority of the heat value, on a mass flow basis (e.g. pounds of fuel per hour), the sludge exceeded the natural gas.

Although the paper mill sludge contained only small amounts of heavy metals, such heavy metals were entrained in the slag, and the slag passed leachate testing.

The results were comparable for both the single source paper mill sludge and the composite sludge with limestone added as a flux.

Figure 2:
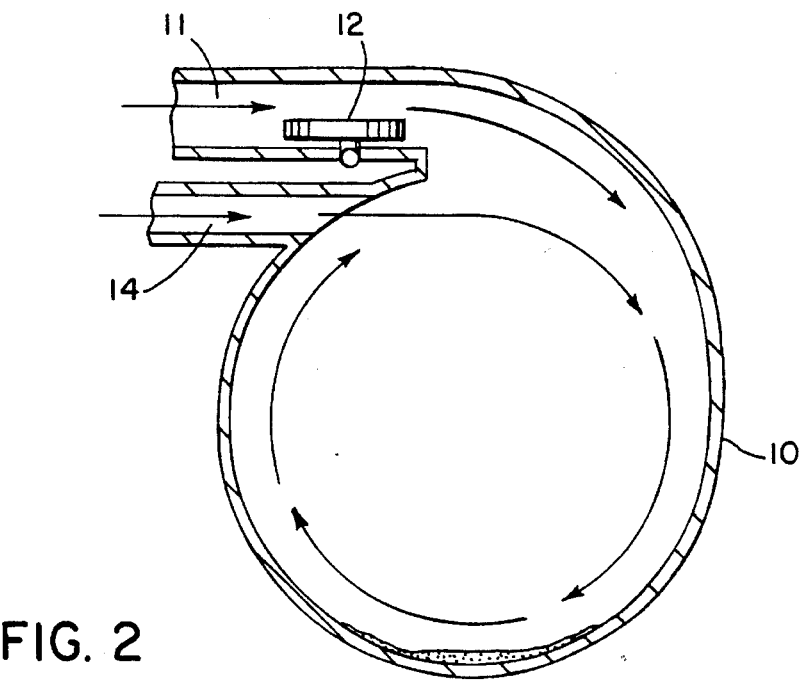
FIG. 2 is a transverse cross-section of the cyclone furnace taken in the plane of the line 2—2 in FIG. 1.

FIGS. 1 and 2 show a cyclone furnace adapted for the burning of paper mill sludge. The cyclone furnace consists of a cyclone barrel 10 which is a horizontal water-cooled cylinder. The cyclone barrel 10 includes a secondary air inlet 11 which enters the cyclone barrel 10 tangentially as shown in FIG. 2. Gas burners 12 are mounted at the air inlet 11 to the cyclone barrel 10. A gas ignitor 13 is disposed adjacent to the burners 12. Injectors 14 are spaced along the cyclone barrel 10. The sludge along with primary air enters the cyclone barrel 10 through the injectors 14. The primary air and the secondary air causes a swirling flow of the natural gas, sludge, and air within the cyclone barrel 10 and from the barrel 10 into the inside of the furnace 15. The furnace 15 may be connected to a boiler in any of a number of known manners.

Slag forms on the inner surface of the cyclone barrel 10. The molten slag exits through a slag spout opening 16 and passes to a slag tap 17 where the molten slag is removed and typically cooled by quenching.

Since a single source of paper mill sludge may be inadequate as a supplemental fuel source for a cyclone furnace fueling a boiler, it is possible that a blend of paper mill sludges will be required. The sludges can be blended as a part of a process for tumble drying of the sludges. For large scale cyclone furnace operation, the optimal size for the sludge would be between ⅜" and ⅝". Furthermore, for ease in handling, it may be desirable to agglomerate the sludge into pellets.

Limestone or other fluxing agents may not be needed. Whether a flux is needed depends upon the slag viscosity produced by the sludge. The standard of measurement is a T-250 temperature which is the temperature at which the slag has a viscosity of 250 poise. If the T-250 temperature is below the operating temperatures in the cyclone furnace, no flux is necessary.

Although the slag is typically cooled quickly by quenching and then crushed for use, the molten slag could be delivered directly to a molding or forming operation for molding into useful articles, such as bricks or tiles, or forming into a fiber-like substance, such as mineral wool. The slag, however cooled, will have a glass-like consistency. If landfilling is required, the slag is in a condition that is easily handled compared to the sludge or ash.

Sewage sludges or other sludges resulting from industrial wastewater treatment can be converted using the process of this invention. Such sludges have a similar volatile component, similar organic constituents, and similar ash content to paper mill sludge. The ultimate and mineral analyses of typical sewage sludges are set forth in U.S. Pat. No. 5,057, 009, issued Oct. 15, 1991, to the present inventor.

The ability of cyclone furnaces to burn sludge and to convert its ash content to usable slag is a superior technology to other presently available methods for disposing of paper mill sludge. Optimal results are obtained in conventional cyclone furnaces by using partially dried sludge (i.e. about 20% or less moisture). However, wetter sludge can be accommodated with suitable equipment for feeding into the furnace and if sufficient heat is generated to evaporate the moisture while maintaining temperatures high enough to form the slag.

The sludge may constitute in excess of 50% of the heat value of fuel to the cyclone furnace. This is particularly true if the moisture content of the sludge entering the furnace is low, or if the ash content is low. Also, adding a greater proportion of flux will reduce the temperature necessary to form the slag and allow an increased percentage of heat value to be provided by the sludge.

Shredded tires can be co-fired with paper mill sludge to reduce the natural gas requirement. Coal or fuel oil may be used as a supplemental fuel. In all cases, the mass flow rate of the sludge can exceed that of the other fuels delivered to the cyclone furnace.

Most of the ash from the sludge will melt into slag and only a small fraction of ash (less than 5%) is likely to be entrained in the combustion gases. The slag from sludge co-firing is solid, hard, strong, and durable and similar to slag from coal combustion in a cyclone furnace.

I claim:

1. A method of converting paper mill sludge and like organic sludges having a high ash content, comprising:

introducing the sludge into a cyclone furnace along with a second source of fuel to burn the sludge and recover the heat value of the sludge and to convert the ash content of the sludge to a slag.

2. The method in accordance with claim 1 wherein the sludge contributes from about 10% to about 40% of the heat input to the furnace.

3. The method in accordance with claim 1 wherein the sludge contributes in excess of 50% of the heat input to the furnace.

4. The method in accordance with claim 1 wherein the sludge is dried to a moisture content suitable for handling before being introduced into the cyclone furnace.

5. A method of converting of paper mill sludge and like organic sludges having a high ash content, comprising:

drying the sludge to a moisture content of about 20% or less; and burning the dried sludge in a cyclone furnace along with a second source of fuel to recover the heat value of the sludge and to convert the ash content of the sludge to a slag.

6. The method of claim 5 together with the step of agglomerating the sludge into pellets before burning.

7. A method of converting the ash in a sludge having a significant organic content and an ash content of between about 20% and about 50% on a dry weight basis, comprising:

burning the sludge in a cyclone furnace to produce a hard, strong, and durable glassy slag that includes the ash; and removing the molten slag from the furnace.

8. The method in accordance with claim 7 wherein the sludge is dried to a moisture content of about 20% or less before burning.

9. The method in accordance with claim 7 wherein the molten slag is molded into a glass-like product.

10. The method in accordance with claim 7 wherein the molten slag is formed into fibers.

11. A method of fueling a cyclone furnace, comprising:

fueling the furnace with natural gas; and simultaneously fueling the furnace with paper mill sludge or like organic sludge having a high ash content.

12. A method of fueling a cyclone furnace, comprising:

fueling the furnace with paper mill sludge or like organic sludge having a high ash content; and simultaneously fueling the furnace with one or more additional fuels.

13. A method in accordance with claim 12 wherein the sludge contributes the highest mass flow rate of any fuel to the furnace.

* * * * *